US012224806B2

(12) United States Patent
De La Forest Divonne et al.

(10) Patent No.: US 12,224,806 B2
(45) Date of Patent: Feb. 11, 2025

(54) METHOD AND DEVICE FOR RECOGNIZING A USER

(71) Applicant: ORANGE, Issy les Moulineaux (FR)

(72) Inventors: Aymeric De La Forest Divonne, Chatillon (FR); Philippe Levionnais, Chatillon (FR)

(73) Assignee: ORANGE, Issy les Moulineaux (FR)

( * ) Notice: Subject to any disclaimer, the term of this patent is extended or adjusted under 35 U.S.C. 154(b) by 546 days.

(21) Appl. No.: 17/416,839

(22) PCT Filed: Dec. 19, 2019

(86) PCT No.: PCT/FR2019/053194
§ 371 (c)(1),
(2) Date: Jun. 21, 2021

(87) PCT Pub. No.: WO2020/128356
PCT Pub. Date: Jun. 25, 2020

(65) Prior Publication Data
US 2022/0084025 A1 Mar. 17, 2022

(30) Foreign Application Priority Data
Dec. 21, 2018 (FR) ...................................... 1873759

(51) Int. Cl.
*G06F 21/00* (2013.01)
*G06F 21/34* (2013.01)
(Continued)

(52) U.S. Cl.
CPC ........... *H04B 13/005* (2013.01); *G06F 21/34* (2013.01); *G06V 40/15* (2022.01)

(58) Field of Classification Search
CPC ........ H04B 13/005; G06F 21/34; G06V 40/15
See application file for complete search history.

(56) References Cited

U.S. PATENT DOCUMENTS

2014/0244447 A1* 8/2014 Kim .................. G06Q 30/0643 705/27.2
2014/0313154 A1* 10/2014 Bengtsson ........... H04B 13/005 345/173
(Continued)

FOREIGN PATENT DOCUMENTS

EP 1259930 B1 6/2005
EP 2608158 A1 * 6/2013 ......... G07C 9/00087
WO 2016001506 A1 1/2016

OTHER PUBLICATIONS

International Search Report dated Mar. 10, 2021 for International Application No. PCT/FR2019/053194, filed Dec. 19, 2019.
(Continued)

*Primary Examiner* — Kendall Dolly
(74) *Attorney, Agent, or Firm* — David D. Brush; Westman, Champlin & Koehler, P.A.

(57) ABSTRACT

A method for recognising a user whose body is capable of re-transmitting an electromagnetic signal in the form of an electromagnetic wave. The method is implemented on a transceiver device and includes the following steps on the device: transmitting an electromagnetic pulse signal; obtaining a re-transmitted signal when the user is in the vicinity of the device, the signal depending on the transmitted pulse signal; comparing the re-transmitted signal with at least one reference signal of the user; and recognising the user if the re-transmitted signal is close to the reference signal.

20 Claims, 3 Drawing Sheets

Figure 1:
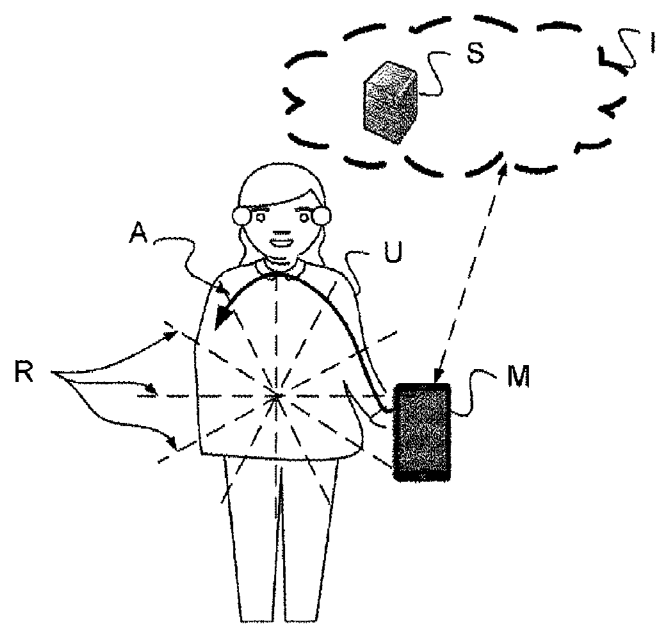

S
I
A
U
R
M

(51) Int. Cl.
*G06V 40/10* (2022.01)
*H04B 13/00* (2006.01)

(56) References Cited

U.S. PATENT DOCUMENTS

| | | | | |
|---|---|---|---|---|
| 2016/0227446 | A1* | 8/2016 | Rodzevski | H04B 13/005 |
| 2017/0285871 | A1* | 10/2017 | Jung | G06F 3/017 |
| 2018/0316442 | A1* | 11/2018 | Kim | H04B 13/00 |
| 2018/0357463 | A1* | 12/2018 | Chiang | H04L 63/0861 |
| 2020/0295847 | A1* | 9/2020 | Levionnais | H04B 5/77 |
| 2021/0120601 | A1* | 4/2021 | Boudet | H04W 12/50 |
| 2021/0227796 | A1* | 7/2021 | Lopez Galarza | A01K 29/005 |

OTHER PUBLICATIONS

Written Opinion of the International Searching Authority dated Mar. 10, 2021 for International Application No. PCT/FR2019/053194, filed Dec. 19, 2019.

Xuefeng Yin et al, “Personal authentication using the fingerprints of intra-body radio propagation channels”, Medical Information and Communication Technology (ISMICT), 2013 7th International Symposium on, IEEE, Mar. 6, 2013 (Mar. 6, 2013), p. 159-163, XP032415573.

Khorshid, A., et al., “Intra-Body Communication Model Based on Variable Biological Parameters” 49th Asilomar Conference on Signals, Systems and Computers, 2015.

M.Belahcene-Benatia Mébarka, “Facial Authentication and Identification Based on Wavelets and Neural Networks” Materials science review, Larhyss Laboratory No. 2, Sep. 2014 pp. 01-08.

English translation of the Written Opinion of the International Searching Authority dated Mar. 19, 2020 for corresponding International Application No. PCT/FR2019/053194, filed Dec. 19, 2019.

Nakanishi Isao et al, “New dedicated measuring devices for intra-palm propagation signals”, 2014 International Symposium on Biometrics and Security Technologies (ISBAST), IEEE, Aug. 26, 2014 (Aug. 26, 2014), p. 35-38, XP032722687.

Isao Nakanishi et al, “Biometric Identity Verification Using Intra-Body Propagation Signal”, Biometrics Symposium, 2007, IEEE, PI, Sep. 1, 2007 (Sep. 1, 2007), p. 1-6, XP031202446.

* cited by examiner

METHOD AND DEVICE FOR RECOGNIZING A USER

CROSS-REFERENCE TO RELATED APPLICATIONS

This Application is a Section 371 National Stage Application of International Application No. PCT/FR2019/053194, filed Dec. 19, 2019, which is incorporated by reference in its entirety and published as WO 2020/128356 A1 on Jun. 25, 2020, not in English.

1. FIELD OF THE INVENTION

The invention relates to the recognition of a human or animal user carrying a device allowing near-field communication. More specifically, it relates to the authentication or identification of a user carrying a mobile terminal.

2. PRIOR ART

To authenticate or identify a user carrying a mobile terminal, such as a smartphone for example, many solutions are known: inputting of a confidential code, facial recognition, fingerprint, iris authentication, etc. They notably make it possible to unlock a connected and powered terminal, such as a smartphone for example, and possibly perform secure transactions reserved to the single authenticated or identified user.

However, these methods presuppose a particular action on the part of the user: placing the face close to the screen, placing a finger on the fingerprint reader, etc. In addition, the user may be reluctant to supply information that he or she deems sensitive, such as his or her fingerprint for example, which can be reused for dishonest purposes.

3. SUMMARY OF THE INVENTION

The invention improves the state of the art. To this end, it proposes a method for recognizing a user whose body can transmit an electromagnetic signal in the form of an electromagnetic wave, the method being implemented on a transceiver device, and comprising the following steps on the device:

- transmission of a pulsed electromagnetic signal;
- obtaining of a signal retransmitted when the user is in proximity to the device, said signal being dependent on the pulsed signal transmitted;
- comparison of the retransmitted signal with at least one reference signal of the user;
- recognition of the user if the retransmitted signal is close to the reference signal.

According to the invention, a method for recognizing a user is proposed. Advantageously, such a device allows a user to be recognized, and therefore authenticated or identified in order to validate a transaction very simply, since the user performs no particular action to be recognized. The signal retransmitted and received by the device is dependent on the user, and the knowledge thereof allows him or her to be recognized. The form of the signal generated and transmitted via the body of the user depends in fact on a certain number of characteristics specific to the carrier (build, age, sex, humidity of the tissues, etc.). The analysis of such a signal (form, power, etc.) makes it possible to extract therefrom characteristics which are specific to it, and therefore recognize it by comparison with a known similar reference signal (a signature). If another user appropriates the terminal, since he or she does not have the same biometric characteristics, he or she will not be able to be recognized.

"Recognition" is understood here to mean the recognition of the signature of the user in the broad sense. It can relate to an authentication, that is to say a verification of the legitimacy of the user of the terminal (or recognition of the fact that the user is indeed the owner of the telephone), or an identification of the user, that is to say the establishment of the identity of the user (it is indeed Jacques and not Paul); the identification can naturally be followed by an authentication (Jacques can legitimately use the terminal) and vice versa.

"Transceiver device" is understood to mean any device capable of transmitting a pulsed signal in the form of an electromagnetic wave, for example of NFC type. Such a device can be any terminal associated with the user.

By virtue of the invention, the recognition is automatic and secure. In fact, according to the prior art, the user wanting to be recognized must, for that, perform a specific action, such as enter a code for example, or present his or her fingerprint, etc.

"Reference signal" is understood to be either the signal itself or a set of data allowing it to be represented.

"Proximity" is understood to mean a distance that is small enough for the communication to be established over the human channel (for example less than a few cm). It will be noted that the skin of the user does not need to be in contact with the terminal for the communication to be established; nor does the hand of the user necessarily need to be in physical contact with the antenna of the device.

According to a particular embodiment of the invention, the recognition step of the method is followed by a step of updating of the reference signal of the user by taking the retransmitted signal into account.

Advantageously according to this embodiment, the signal used for the recognition is used to update the signature of the user. In fact, the body print of the user is intrinsic to him or her and can change with time (as a function of his or her age, etc.). This signature may therefore be regularly updated, thereby ensuring a higher level of security than a static biological parameter (fingerprint, iris print, etc.) which does not change with time and which can, in addition, be stolen.

According to a particular embodiment of the invention, the recognition step of the method is followed by a step of unlocking of the transceiver device.

Advantageously according to this embodiment, the device can be unlocked automatically as soon as the user grasps it (or approaches it) and automatically retransmits, via his or her body, the electromagnetic wave which has been transmitted by the device.

According to another particular embodiment of the invention, the recognition step of the method is followed by a step of authorization of a transaction.

Advantageously according to this embodiment, a transaction requiring an authentication of the user, such as a bank transaction for example, can be performed automatically, as soon as the user approaches the device, and without the implementation of a complex authentication procedure as proposed in the prior art.

According to another particular embodiment of the invention, said at least one reference signal is associated with an identifier of a user and the recognition step is followed by a step of selection of the user recognized by his or her identifier.

Advantageously according to this embodiment, the user is identified (in addition to being authenticated if necessary), that is to say that he or she is recognized from among several users. This can make it possible to implement personalized transactions: selection of a profile of the user, display of personalized information, personalization of the device or of another device to which it is linked, etc.

According to another particular embodiment of the invention, the step of comparison of the retransmitted signal with at least one reference signal of the user comprises the following substeps:

- digitization of the received signal;
- standardization of the digitized signal;
- measurement of a distance between the two signals.

This embodiment of the invention makes it possible to simply implement a step of comparison between the signal obtained in return and the reference signal. Any type of distance computation available to the person skilled in the art will be able to be used. This distance can conventionally be compared to a predetermined threshold, or acceptable maximum distance between the two signals. Since the two signals are not necessarily aligned, for example because the user wears different clothes, or because the terminal is more or less distant from the body, it is desirable to first use a processing algorithm capable of standardizing the second signal in order to take account of any amplitude difference between the signals.

The invention relates also to a method for learning a signature of a user whose body can retransmit an electromagnetic signal in the form of an electromagnetic wave, in order for him or her to be recognized, the method being implemented on a transceiver device, and comprising the following steps on the device:

- transmission of at least one pulsed electromagnetic signal;
- obtaining of at least one retransmitted signal when the user is in proximity to the device, said signal being dependent on the pulsed signal transmitted;
- generation of a reference signal, called signature, as a function of said at least one retransmitted signal received;
- saving of said reference signal as signature of the user.

According to the invention, a method for learning the signature of a user, in order for him or her to be recognized, is proposed. This method makes it possible to save a signature of the user, with a view to it being subsequently compared with the response of the body of the user to a pulsed signal transmitted by the device.

According to another particular embodiment of the invention, the learning method is also characterized in that the reference signal is saved in association with an identifier of the user.

According to another particular embodiment of the invention, the learning method is further characterized in that the reference signal depends on a validation motion executed by the user when he or she approaches the device.

Advantageously according to this embodiment, it is possible to combine the biometric signature of the user with a signal relating to a particular motion on the part of the user when he or she approaches the terminal. Such a deliberate approach to an IBC terminal has notably been described in the application published under the number WO 2016/001506 A1. The motion of the user in fact modifies the nature of the wave received and/or retransmitted, such that the signature bears the mark of the motion: the signal is not retransmitted in the same way depending on whether the user approaches quickly or slowly, speeding up or slowing down, etc.

According to a hardware aspect, the invention relates also to a device for recognizing a user whose body can retransmit an electrical signal in the form of an electromagnetic wave, wherein it comprises:

- a module for transmitting a pulsed electrical signal;
- a module for obtaining a signal retransmitted when the user is in proximity to the device, said signal being dependent on the pulsed signal transmitted;
- a module for comparing the retransmitted signal with at least one reference signal of the user;
- a module for recognizing the user if the retransmitted signal is close to the reference signal.

According to another hardware aspect, the invention relates also to a mobile terminal comprising such a recognition device.

According to another hardware aspect, the invention relates also to an access control device comprising such a recognition device.

According to a hardware aspect, the invention relates also to a device for learning a signature of a user whose body can retransmit an electromagnetic signal in the form of an electromagnetic wave, wherein it comprises:

- a module for transmitting a pulsed electrical signal;
- a module for obtaining a signal retransmitted when the user is in proximity to the device, said signal being dependent on the pulsed signal;
- a module for generating a reference signal, called signature, as a function of said at least one retransmitted signal received;
- a module for saving said reference signal as signature of the user.

According to another hardware aspect, the invention relates also to a mobile terminal comprising such a learning device.

According to another hardware aspect, the invention relates also to an access control device comprising such a learning device.

The invention relates also to a computer program comprising instructions for implementing one of the above methods according to any one of the particular embodiments described previously, when said program is executed by a processor. The method can be implemented in various ways, notably in hardwired form or in software form. This program can use any programming language, and can be in the form of source code, object code, or of intermediate code between source code and object code, such as in a partially compiled form, or in any other desirable form.

The invention also targets a storage medium or information medium that can be read by a computer, and comprising instructions of a computer program as mentioned above. The storage media mentioned above can be any entity or device capable of storing the program. For example, the medium can comprise a storage means, such as a ROM, for example a CD ROM or a microelectronic circuit ROM, or even a magnetic storage means, for example a hard disk. Also, the storage media can correspond to a transmissible medium such as an electrical or optical signal, which can be conveyed via an electrical or optical cable, wirelessly or by other means. The programs according to the invention can in particular be downloaded over a network of Internet type.

Alternatively, the storage media can correspond to an integrated circuit in which the program is incorporated, the circuit being adapted to execute or to be used in the execution of the method concerned.

4. LIST OF FIGURES

Figure 2:
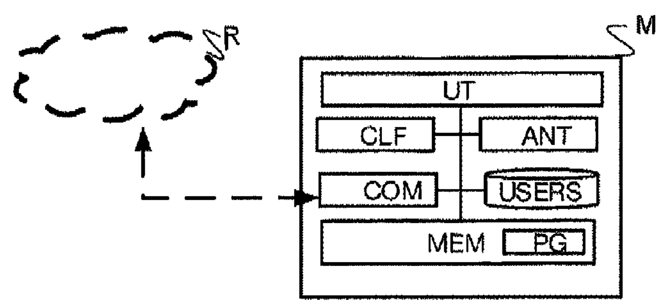
Figure 3:
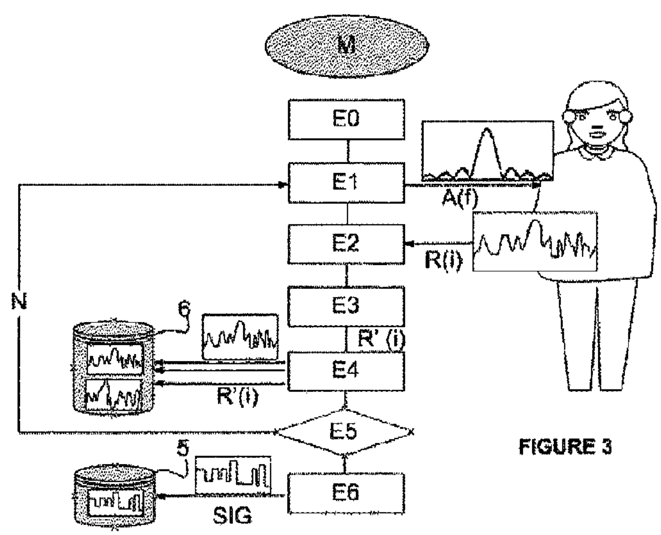
Figure 4:
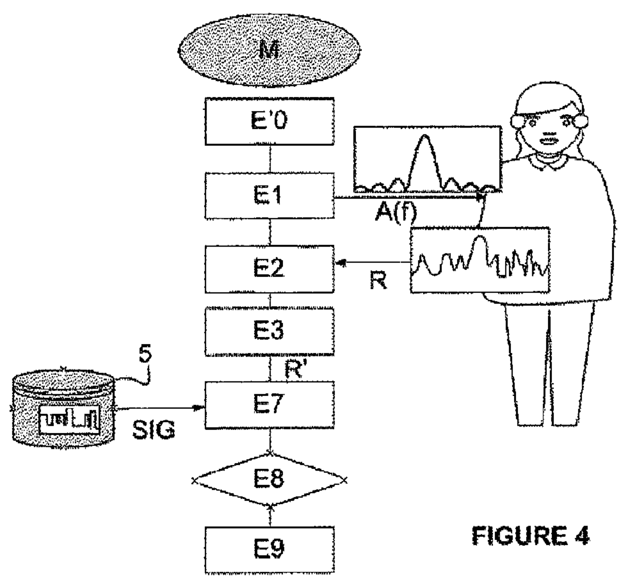
Figure 5:
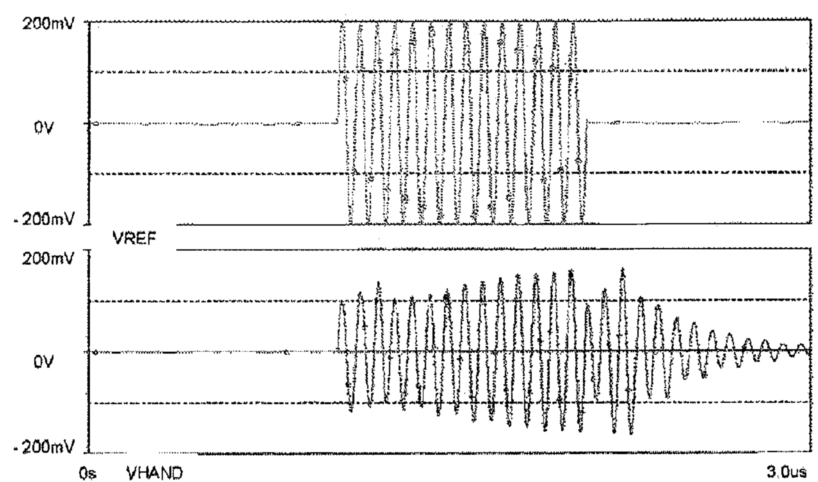

Other features and advantages of the invention will emerge more clearly on reading the following description of particular embodiments, given as simple illustrative and nonlimiting examples, and the attached drawings, in which:

FIG. 1 illustrates an example of an environment of implementation of the invention according to a particular embodiment, FIG. 2 illustrates the architecture of a system implementing the invention according to an embodiment, FIG. 3 illustrates steps of the method for learning a signature according to a particular embodiment of the invention, FIG. 4 illustrates steps of the recognition method according to a particular embodiment of the invention, FIG. 5 shows an example of pulsed response received for a user.

5. DESCRIPTION OF AN EMBODIMENT OF THE INVENTION

5.1 General Principle of the Invention

The recognition method described here allows a user to be recognized, that is to say authenticated or identified, on a transceiver device, hereinafter called terminal. This terminal is powered and preferably connected and mobile, such as, for example, a smartphone, a connected bracelet, a collar, etc.

The recognition method allows the user to be authenticated by the smartphone, to unlock it and/or to use added value services such as payment, transportation or other applications, that require strong authentication. Advantageously, the user does not need to perform a specific act to be recognized.

The invention is founded on the use of a near field technology, of NFC type. It will be recalled that near field communications, normally called NFC, based primarily on the ISO (International Standard Organization) 14443 standard, use wireless technologies to allow an exchange of information between two remote peripheral devices over a short distance, typically less than a few centimeters. The communications of this type offer numerous applications, for example in the fields of payment and transportation.

More recently, new types of wireless communications have emerged based on the same concepts but that additionally use the human body for the communication channel. For these technologies, that are grouped together under the generic term IBC (Intra-Body Communication) or even BCC (for Body Channel Communication), the human body acts as an element for transmitting information from one point to another. These methods use an electromagnetic coupling between the system and the human body, and are suited to proximity communication, which does not necessarily require physical contact with the device.

When the user is in proximity to the terminal, a pulsed signal emitted by the terminal is transmitted into his or her body with a certain frequency, corresponding preferably to that of NFC. The human body then behaves as an antenna and retransmits an electromagnetic wave with characteristics (resistance/capacitance/etc.) that are specific to each individual. The response to the NFC pulse is consequently unique and allows the user to be authenticated. It is still possible to couple this new recognition modality with other, already existing ones. It is also possible to consider not a human being but an animal, carrying an NFC device (for example a cat, the method being used to lock its electronic cat flap).

5.2 Particular Embodiments of the Invention

FIG. 1 illustrates an example of an environment of implementation of the invention allowing a user (U) of a mobile terminal (M), designated here as the "carrier", to be authenticated to perform a transaction via his or her cellphone.

The user (U) or carrier of the terminal (M), is, according to this example, a human being.

The terminal (M) according to the invention is a handheld device naturally capable of transmitting and receiving radio carrier waves, via an antenna, through the body of the user (U). To this end, the terminal (M) is situated in immediate proximity to the user (U), without necessarily being in direct contact therewith. For example, the terminal (M) is placed in the hand of the user, or at a few centimeters from his or her hand if he or she is approaching it. In these configurations, it is estimated that the antenna of the terminal (M) is no farther than a few centimeters away from the body of the user. The distance is, for example, less than 5 cm. The terminal (M) is equipped with a battery or cells, for autonomous operation. It is, according to this example, a mobile terminal equipped with an NFC antenna (not represented) suitable, in IBC mode, for receiving the modulated electrical signals in the form of an electromagnetic wave through the body of the user. Suitable is understood to mean that its antenna can be amplified, or that the antenna has a sufficiently high gain. Acquiring such an antenna or amplifying it is within the scope of the person skilled in the art.

Transaction is understood to mean any type of transaction, for example a monetary transaction, a purchase, a ticket validation, the customization of an environment, an unlocking, etc.

It is assumed, according to a first example, that the user wants to validate a purchase via the network (I), for example a mobile network or the Internet. The terminal can establish, with a server (S) of the network, a secure communication in order to validate the monetary transaction; the user must be authenticated with the server, that is to say that, at the end of the method, there is certainty that he or she is indeed the owner of the terminal.

According to another example, the user (U) wants to customize an object via his or her mobile (a connected object, a workstation, etc.) for the object to perform appropriate actions depending on the person who controls it via the mobile terminal (locking, personalized display, etc.); the user must, in this case, be authenticated, and if necessary identified, that is to say that, at the end of the method, he or she can be discriminated from among several people.

According to yet another example, the user wants to unlock his or her mobile terminal. For that, it is sufficient for him or her to be in proximity, for example upon taking hold, for the recognition process to be triggered and the mobile to be unlocked if authenticated successfully.

In all the cases, the method according to the invention proceeds in two distinct stages, or phases:

—First Phase: Learning of the Signature.

In a first phase, which corresponds to a so-called learning phase, the user performs, several times (hereinafter, N times, where N is a natural integer), an operation of triggering the learning module on his or her terminal. The aim of this step is to recover, on the terminal (or, alternatively, on another device with which the terminal can exchange data), a plurality (N) of signals which correspond to the signals generated by the person (U) in response to a pulse triggered by the learning method of the mobile. These signals correspond to the characteristics of the user, but with small variations, because the same mechanical/dynamic and physiological parameters of the user can vary over time, resulting in a variation of the signal propagated then retransmitted by the body. Nevertheless, for a given person receiving a pulse from a given terminal, all the signals are of overall very similar form and represent a kind of biometric print of the user, that will hereinafter be called "characteristic print" or "signature" of the user. The characteristic print is therefore representative of the intrinsic characteristics of the body of the user; it is in fact well known that certain biological factors, such as, for example, the age, the humidity of the tissues of the body, etc. of the user can influence its transmission characteristics. Reference can for example be made to the article "Intra-Body Communication Model Based on Variable Biological Parameters" (Khorshid et al., 2015, 49th Asilomar Conference on Signals, Systems and Computers). In addition, this print can be characteristic of the motor control of the user if he or she performs a particular gesture toward the mobile when he or she establishes proximity.

The characteristic print (SIG) can be obtained by the N slightly different measurements entrusted to a learning module charged with calculating a "mean value" of the different signals, or typical signal corresponding to the characteristic print. This module is, for example, an automatic learning, or machine learning (ML) module. It will be recalled that machine learning, or statistical learning, relates to the design, the analysis, the development and the implementation of methods allowing a machine (in the broad sense) to evolve through a systematic process, and thus to fulfil difficult or problematical tasks by more conventional algorithmic means. One possible example of machine learning is that of classification whose aim is to label each datum by associating it with a class. It is also possible to envisage using neural networks, wavelet analysis and decomposition methods, etc.

According to this embodiment, the learning module calculates a characteristic print from the different signals returned by a user (for example it takes an average of all the valid tests, establishes a set of characteristic parameters of the print, etc.). Then, it saves in a database the reference signals of users possibly identified by an identifier. Once the learning has been performed, the resulting signature can advantageously be saved on the terminal of the user. If the terminal is used by several users, several characteristic signatures can be saved, for example in conjunction with an identifier of each user if there is an interest in discriminating between them.

—Second Phase: Use of the Signature to Recognize the User.

In a second phase (of implementation of the service), the user of the IBC mobile terminal who wants to unlock his or her terminal or validate a transaction approaches it and activates the application (unlocking, payment, validation, personalization, etc.). The terminal transmits a pulsed signal which is propagated in the body of the user. A return signal is received by the terminal. A checking module of the terminal or one linked to the terminal (for example on an external server) checks the signature of the user. It can, typically, compare the typical signal curve corresponding to the retransmitted signal to a signal curve corresponding to the signature of the user, which was previously saved on the terminal or in a database that can be accessed by the terminal.

If his or her signature is recognized, the user is identified or authenticated and the transaction can be performed.

The invention presents an essential advantage of ergonomy and of security in as much as it allows the person wanting to access a secure service to be identified and/or authenticated via his or her signature without having to perform a particular gesture (facial or iris or fingerprint recognition, code input, etc.).

This exemplary embodiment has been given in an illustrative and nonlimiting manner. Many variants can be applied to it. Notably, another device, for example an external server, can perform the learning and/or the recognition on reception of the data from the terminal. Moreover, the recognition and learning phases can be combined to produce an update of the signature: after the recognition of the user, the signal retransmitted by the body of the user in the recognition phase can be used advantageously to update the characteristic print. This notably allows the signature of the user to be changed over time, to take account of the changes to his or her biological characteristics (due to age for example) and mechanical characteristics (due to his or her speed of approach to the terminal, for example).

FIG. 2 illustrates a terminal M configured to implement the method for recognizing a user according to a particular embodiment of the invention. Such a terminal is configured to implement the recognition method according to any one of the particular embodiments of the invention described above, as well as the learning method.

According to a particular embodiment of the invention, the device M has the conventional architecture of a cellphone, of smartphone type, and notably comprises a memory MEM, a processing unit UT, equipped for example with a processor, and driven by the computer program PG stored in memory MEM. The computer program PG comprises instructions for implementing the steps of the learning or recognition method as described previously, when the program is executed by the processor.

On initialization, the code instructions of the computer program PG are, for example, loaded into a memory before being executed by the processor.

The device M comprises a NFC communication module configured to establish contactless communications, and in particular to transmit a pulsed signal intended to be received by the body of the user, and to receive in return an electromagnetic signal which has passed through and been retransmitted by the body of the user. This module conventionally comprises an NFC antenna (ANT) suitable for receiving signals over the radio channel and via the human body, such that a modulated electrical signal transported by the body of the user can be received by the antenna, which is located in the terminal, in proximity with the human body, and a demodulator that is not represented, intended to receive, via the antenna, a modulated electrical signal and transform it into a digital signal intended to be transmitted to the processing unit, a controller (CLF) and software components (firmware, etc.) necessary to the implementation of the IBC communications.

The memory MEM is configured to store a list, or base (USERS), of signatures. According to a particular embodiment of the invention, such a base associates an identifier with a signature to identify one user from among several.

According to a particular embodiment of the invention, the terminal M comprises a communication module COM configured to establish communications with an IP and/or mobile network to perform a transaction.

FIG. 3 illustrates steps of the signature learning method according to a particular embodiment of the invention.

The learning is done by repetition of the transmission of a pulsed signal (D) by the terminal and the recovery of the response signal which has passed through the body of the user. The user may for example be located in a shop of a telecommunications operator and is preparing to save his or her characteristic print which will be his or her reference signature and which he or she will be able to use thereafter in his or her IBC services.

It is assumed that all the prerequisites necessary to the learning method have been performed during the initialization step E0, such as, for example, the loading and the launching of the application responsible for implementing the learning method on the terminal, and that the terminal is equipped with an NFC/IBC antenna that has appropriate amplification.

In a step E1, the terminal transmits a pulsed signal (A(f)) suitable for transmission via the human body, and which can advantageously be of NFC type (13.56 MHz) but even of any appropriate frequency. For example, a frequency around 10 MHz is also suited to the human body. The body of the user receives the wave and is transformed into an antenna, that is to say that it retransmits an electromagnetic wave.

In a step E2, the terminal receives the pulsed response R(i) (where i represents a signal index from among a plurality of received signals) from the body of the user; to this end, the mobile is positioned (for example by the application) in an electromagnetic wave reception mode. It will be recalled that the antenna must be able to receive the signal, with sufficient gain. The terminal receives and demodulates the signal received.

Then, in a step E3, the terminal proceeds with the sampling and the digitization of the signal and with the forming of the pulsed response; at the end of this processing a processed signal R'(i) (represented in time or frequency, or both, etc.) bears the characteristic values of a signal received as echo. The index i corresponds to the iteration counter, and it can take a value between 1 and N and is incremented on each new iteration of the learning algorithm.

Then, in a step E4, the terminal stores the signal in a memory (represented here in the form of a database (6) by way of example). Alternatively, it can also transmit the signal R'(i) to an external learning server.

The step E5 corresponds to the test of the number of iterations N; as long as the desired number of iterations it not reached, the mobile retransmits a pulsed response (step E1) and receives a new signal (step E2) that it processes then stores with the other signals R'(i) (step E3). For example, the counter N is set to 3 and three valid signals R'(1), R'(2) and R'(3) must be received and saved (at least temporarily in a working memory). When the desired number of iterations is reached, the step E5 will be followed by a step E6 of calculation of the signature (reference signal). It will be noted that the number N of iterations can be predefined (for example N=3) or defined by the algorithm itself: for example if the signals R'(i) are too different from one another, according to a statistical criterium (standard deviation, variance, etc.), the number N can be increased; if the signals R'(i) are very close, it can be reduced.

According to one example, the following algorithm can be used:

acquisition of two signals R(1) and R(2) in response to a pulse transmitted by the mobile, and processing of these signals;

calculation of a distance between the two signals, possibly corrected. Such an example of calculation is conventional to a person skilled in the art in signal processing: for example, a Euclidian distance can be calculated between two first signals. It is also known practice to compare two signals with one another, whether they be analog or digital, to determine a correlation function between these two signals and to check, from the values of this function, whether there is identity or not between the signals. For that, digital correlation function calculation methods are conventionally used.

If the distance is below a certain threshold, calculation of the signature, otherwise acquisition of a third signal R(3) and calculation of a distance between the three curves, or of a second distance between the third signal and the average of the first two, or of a distance between each of the curves and a statistical mean of the three curves, etc.

etc.

According to another example, a neural network can be used, as described in the article "Authentification et Identification de Visages bases sur les Ondelettes et les Réseaux de Neurones." (Facial authentication and identification based on wavelets and neural networks) by M. BELAHCENE-BENATIA Mébarka (Revue science des matériaux, Laboratoire LARHYSS No 02, September 2014 pp. 01-08). The method described, based on the transformation of a two-dimensional image of a face into a vector of size N obtained by chaining together the rows (or columns) of the corresponding image, followed by the establishment of covariance matrix between the different images, can easily be adapted to the samples of the digital signals obtained from the signals R(i).

In the step E6, the learning program calculates the signature SIG from all (N) the signals R(i) received. Any method within the scope of the person skilled in the art for obtaining a signal representative of the N signals can be used, for example: an average is taken, or a (convolutional) neural network is used to learn to recognize the user, or an SVM (Support Vector Machine) system is used to classify the various signals received by placing them in the subset corresponding to the signals of the user, etc.

The signal can typically take the form of an analog or digital signal, that is to say a function representing the variations of the signal corresponding to the mean response from the user over a time interval, for example a few seconds. Such a signal is represented by way of example in FIG. 5. Alternatively, the signature could take the form of any set of data characteristic of the signal generated by the movement of the user, dependent both, as explained above, on the biological characteristics of the user, and on the characteristics of the terminal: set of digital data; index in an existing dictionary of signatures corresponding for example to categories of users of the system (according to their age, sex, build, etc.).

The signature thus calculated is stored in a memory, or database (5), either in the mobile, or in an external database, preferably with an identifier of the user (for example his or her name, date of birth, telephone number, the MAC address of his or her terminal, his or her bank account number, etc.).

FIG. 4 illustrates steps of the recognition method according to a particular embodiment of the invention.

According to this embodiment, the user wants to be authenticated by his or her mobile terminal, in order, for example, to unlock it or perform a transaction, for example of monetary type. It is assumed here, without loss of generality, that the aim is to unlock the terminal or smartphone. The user grasps the smartphone, or at least approaches it, and an automatic identification method follows, without the need for him or her to enter his or her fingerprint, or to enter a PIN code, or to present his or her face to the camera of the smartphone, etc.

It is assumed that the learning phase described previously based on FIG. 3 has been performed and that the signature of the user is located on the mobile terminal (it is recalled that it could be located elsewhere, in a database external to the terminal).

The step E'0 is identical to the step E0 described previously for the learning method, except for the application which has to be executed: here it is the recognition application. This application can be launched by the user, or run in the background, or when the grasping of the mobile or approach to the mobile has been detected (for example using a gyroscope, an accelerometer, a sensor, etc.) or even by an action of the user (a press on the unlock button or on the screen) or cyclically/periodically.

The steps E1, E2, E3 are identical to the corresponding steps described previously based on FIG. 3.

In a step E7, the terminal accesses the memory (or database) to read the "signature" (characteristic pulsed response) of the user. If the memory accessed is not located on the terminal but, for example, on a server, a communication channel can be opened with the network for access thereto.

In the comparison step E8, the signal received and processed (R/R') is compared to the signature (SIG) of the user. This makes it possible to check that it is indeed the user of the terminal who has grasped it, in other words this step performs a recognition (authentication or identification) of the carrier. Several types of comparison can be performed, such as, for example:

- calculation of "distance" between the received signal (R') and the signature stored in the database. If the distance between the two signals is below a threshold, the user is authenticated. It is for example possible to make a point-for-point correlation between the two signals (the candidate signal received and the signal corresponding to the signature) by calculating a difference of each value of the two curves, possibly by shifting the received signal onto the reference signal. The minimum value obtained should be close to zero if the two curves are very similar.
- wavelets method with decomposition and analysis of the time-frequency matches;
- use of (standard or convolutional) neural networks, in which a multilayer system of neurons learns, by adjusting internal weights, to recognize a person from the signal obtained. Such an approach is known and can be accessed via standard signal processing software, for example MATLAB.

At the end of this comparison step, if the received signal corresponds to the signature, the user is authenticated and the step E8 can be followed by a step E9 of implementation of the unlocking and/or of the transaction, for example the validation of a payment. Otherwise, that is to say if the pulsed response R/R' does not correspond to the signature, it is for example possible to return to the step E1 and retransmit a pulsed signal. According to a variant, a predefined number of retransmissions (for example 2) can be authorized before cancellation of the transaction.

The step E9 can also comprise a substep of updating of the signature: the signal R' obtained after processing can be used to modify the signature of the user, which may notably have changed for biometric reasons (he or she has aged, put on weight, etc.), or mechanical reasons (his or her approach to the mobile is different).

FIG. 5 shows an example of pulsed response received for a given user. The top curve of FIG. 5 represents a temporal signal corresponding to a pulse. Such a signal is naturally given as an example, the pulse notably being able to be of shorter duration, without loss of generality. The bottom curve represents the temporal response to this pulse when the body of a given human user has retransmitted the pulsed signal. The two waves can clearly be superimposed. The differences between the two curves (frequency, amplitude, envelope, etc.) are characteristic of the transmission of the signal in the human body.

It goes without saying that the embodiment which has been described above has been given in a purely indicative and nonlimiting manner, and that many modifications can easily be made by the person skilled in the art without in any way departing from the framework of the invention.

The invention claimed is:

1. A recognition method for recognizing a user, the method being implemented on a transceiver device and comprising the following acts implemented on the transceiver device:

transmitting a pulsed electromagnetic signal;

receiving, by a near field communication (NFC) antenna of the transceiver device in an intra-body communication (IBC) mode, a retransmitted signal retransmitted by his or her body when the user is in proximity to the transceiver device, said retransmitted signal being dependent on the pulsed electromagnetic signal transmitted;

comparing the retransmitted signal with at least one reference signal of the user by measuring a distance between the retransmitted signal and the at least one reference signal; and recognizing the user if the measured distance is below a threshold.

2. The recognition method as claimed in claim 1, wherein the recognizing is followed by updating the at least one reference signal of the user by taking the retransmitted signal into account.

3. The recognition method as claimed in claim 1, wherein the recognizing is followed by unlocking the transceiver device.

4. The recognition method as claimed in claim 1, wherein the recognizing is followed by authorizing a transaction.

5. The recognition method as claimed in claim 1, wherein said at least one reference signal is associated with an identifier of the user and wherein the recognizing is followed by selecting the user recognized by his or her identifier.

6. The recognition method as claimed in claim 1, wherein the method comprises, before comparing the retransmitted signal with the at least one reference signal of the user:

digitizing the received retransmitted signal; and standardizing the digitized retransmitted signal.

7. The recognition method as claimed in claim 1, wherein the method comprises, in response to the measured distance being above the threshold:

acquiring a third signal;

calculating an average distance between the third signal, the retransmitted signal and the at least one reference signal; and recognizing the user if the average distance is below the threshold.

8. A method for learning a signature of a user in order for him or her to be recognized, the method comprising the following acts implemented on the transceiver device:

transmitting at least one pulsed electromagnetic signal;

receiving, by a near field communication (NFC) antenna of the transceiver device in an intra-body communication (IBC) mode, at least one signal retransmitted by his or her body when the user is in proximity to the transceiver device, said at least one retransmitted signal being dependent on the pulsed electromagnetic signal transmitted;

generating a reference signal, called a signature, as a function of said at least one retransmitted signal obtained; and saving said reference signal as signature of the user.

9. The method for learning a signature of a user as claimed in claim 8, wherein the reference signal is saved in association with an identifier of the user.

10. The method for learning a signature of a user as claimed in claim 8, wherein the reference signal depends also on a validation motion executed by the user when he or she approaches the transceiver device.

11. A device for recognizing a user, wherein the device comprises:

a near field communication (NFC) antenna; and a processor configured to:

transmit a pulsed electrical signal using the NFC antenna;

receive, by the NFC antenna in an intra-body communication (IBC) mode, a retransmitted signal retransmitted by his or her body when the user is in proximity to the device, said retransmitted signal being dependent on the pulsed electromagnetic signal transmitted;

compare the retransmitted signal with at least one reference signal of the user by measuring a distance between the retransmitted signal and the at least one reference signal; and recognize the user if the measured distance is below a threshold.

12. A mobile terminal or access control device comprising:

a transceiver device comprising:

a near field communication (NFC) antenna; and a processor configured to:

transmit a pulsed electrical signal using the NFC antenna;

receive, by the NFC antenna in an intra-body communication (IBC) mode, a retransmitted signal retransmitted by his or her body when the user is in proximity to the device, said retransmitted signal being dependent on the pulsed electromagnetic signal transmitted; and compare the retransmitted signal with a reference signal of the user by measuring a distance between the retransmitted signal and the reference signal; and recognize the user based on whether the measured distance is below a threshold.

13. A transceiver device for learning a signature of a user, wherein the transceiver device comprises:

a near field communication (NFC) antenna; and a processor configured to:

transmit a pulsed electrical signal using the NFC antenna;

receive, by the NFC antenna in an intra-body communication (IBC) mode, a retransmitted signal retransmitted by his or her body when the user is in proximity to the transceiver device, said retransmitted signal being dependent on the pulsed electrical signal; and generate a reference signal, called signature, as a function of said retransmitted signal received and save said reference signal as signature of the user.

14. A mobile terminal or access control device for learning a signature of a user, said mobile terminal or access control device comprising:

a transceiver device comprising:

a near field communication (NFC) antenna; and a processor configured to:

transmit a pulsed electrical signal using the NFC antenna;

receive, by the NFC antenna in an intra-body communication (IBC) mode, a retransmitted signal retransmitted by his or her body when the user is in proximity to the transceiver device, said retransmitted signal being dependent on the pulsed electrical signal; and generate a reference signal, called signature, as a function of said retransmitted signal received and save said reference signal as signature of the user.

15. A non-transitory computer-readable medium comprising a computer program stored thereon comprising instructions for implementing method for recognizing a user, when the program is executed by a processor of a transceiver device, wherein the instructions configure the transceiver device to:

transmit a pulsed electromagnetic signal;

receive, by a near field communication (NFC) antenna of the transceiver device in an intra-body communication (IBC) mode, a retransmitted signal retransmitted by his or her body when the user is in proximity to the transceiver device, said retransmitted signal being dependent on the pulsed electromagnetic signal transmitted;

compare the retransmitted signal with at least one reference signal of the user by measuring a distance between the retransmitted signal and the at least one reference signal; and recognize the user if the measured distance is below a threshold.

16. The mobile terminal as claimed in claim 11, wherein the recognizing is followed by updating the at least one reference signal of the user by taking the retransmitted signal into account.

17. The mobile terminal as claimed in claim 11, wherein the recognizing is followed by unlocking the transceiver device.

18. The mobile terminal as claimed in claim 11, wherein the recognizing is followed by authorizing a transaction.

19. The mobile terminal as claimed in claim 11, wherein said at least one reference signal is associated with an identifier of the user and wherein recognize the user is followed by selecting the recognized user by his or her identifier.

20. The mobile terminal as claimed in claim 11, wherein the processor is configured to, in response to the distance being above a threshold:

acquire a third signal;

calculate an average distance between the third signal, the retransmitted signal and the at least one reference signal; and recognize the user if the average distance is below the threshold.

* * * * *